Dec. 6, 1932.  C. EBERT ET AL  1,889,779
METHOD OF PURIFYING SUGAR SOLUTIONS
Filed June 15, 1927
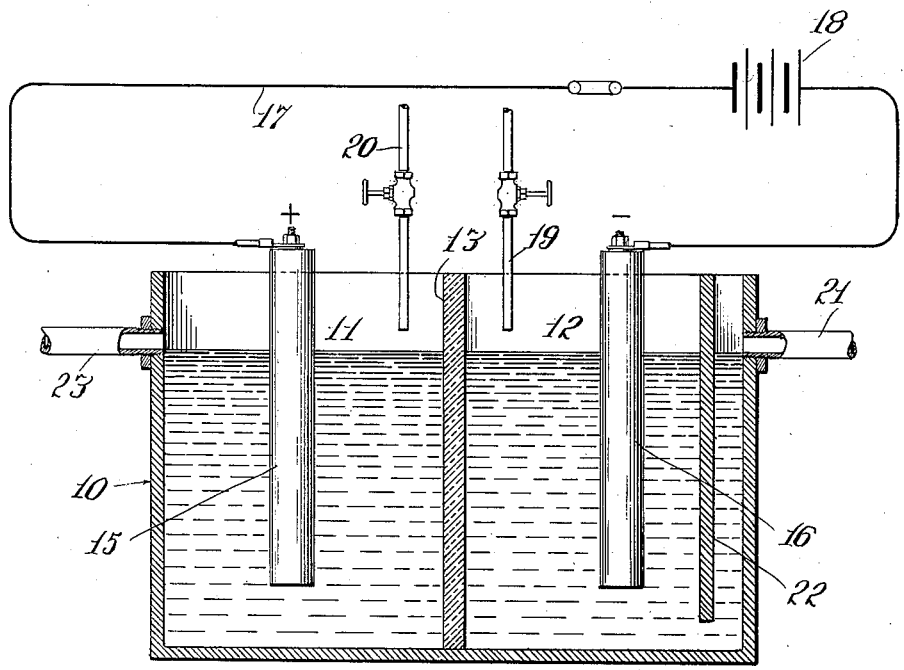

Patented Dec. 6, 1932

1,889,779

UNITED STATES PATENT OFFICE

CHARLES EBERT, OF LEONIA, NEW JERSEY, WILLIAM B. NEWKIRK, OF RIVERSIDE, ILLINOIS, AND MEYER MOSKOWITZ, OF SPRING VALLEY, NEW YORK, ASSIGNORS TO INTERNATIONAL PATENTS DEVELOPMENT COMPANY, OF WILMINGTON, DELAWARE, A CORPORATION OF DELAWARE

METHOD OF PURIFYING SUGAR SOLUTIONS

Application filed June 15, 1927. Serial No. 199,009.

Our invention relates to the removal from starch converted dextrose solutions of impurities such for example as the metallic compounds, fats, proteins, or colloidal substances formed by contact of the solution, or the starch from which the solution is made, with metallic surfaces, piping, vats, copper converters, and the like, and by the reaction of the hydrolyzing acid with non-starch substances in the starch used in the conversion.

The term "starch converted dextrose solutions" is intended to include converter liquors either at the end of the conversion or at any intermediate stage thereof, hydrols or mother liquors obtained from crystallized dextrose magmas by centrifuging, pressing or otherwise, and in fact all dextrose containing liquors derived from starch by hydrolysis and taken from the process at any stage, together with mixtures of all such liquors including re-melts.

Our present invention has for its primary object to provide electrolytic and osmotic methods of coagulating and precipitating and separating impurities from solutions of this character.

The drawing appended hereto illustrates, somewhat diagrammatically, an apparatus for carrying out the method.

The drawing represents a vertical sectional view of an electrolytic and osmotic cell for carrying out the method of our present invention.

Referring to the drawing, 10 is a vessel divided into two compartments 11 and 12 by a permeable diaphragm 13, preferably of unglazed porcelain or other suitable material. The diaphragm should be sufficiently porous to allow certain substances to pass through it and sufficiently dense to prevent others from passing, at least in substantial quantities, as will be hereinafter described. Arranged in the compartments 11 and 12 are the electrodes of the cell, 15 designating the anode and 16 the cathode, which are connected by wire 17 with a source of current supply 18. 19 is a pipe for introducing the sugar solution into compartment 12. 20 is a water supply leading to compartment 11. 21 is an overflow from compartment 12 and 22 a partition arranged so that the outflow through pipe 21 is from the bottom of the cell. 23 is an outflow pipe from the upper part of compartment 11.

The impurities in a starch converted dextrose solution comprise colloids formed largely by the action of the hydrolyzing acid used for conversion on the non-starch substances in the starch, particularly fats, proteins and cellulosic material, together with metallic compounds resulting from contact of the material with metallic surfaces, such as the copper of the converters, and the iron of piping and vessels through which the converted liquor or the starch from which it is made, may have passed. The colloidal particles, or at least a considerable quantity of them, carry positive charges of electricity. When an electric current is passed through the cell these particles migrate to the cathode and coming in contact therewith lose their charge and are coagulated and precipitated. The salts of the heavy metals are in a state of ionization in the solution and under the influence of the electric current the negatively charged acid radicals or ions pass through the diaphragm 13, (which acts as a barrier, to a very considerable extent at least, against the passage of the dextrose) and migrate toward the anode 15, the water in compartment 11 serving as a medium. The metals or hydroxides of metals, which are positively charged, migrate toward the cathode and ultimately hydroxides of these heavy metals (copper, iron, aluminum, etc.) are formed, which will be precipitated.

The elimination of the acid or negatively charged ions of the above mentioned salts and of the hydrolyzing acid from the compartment 12 decreases the hydrogen ion concentration of the sugar liquor in this compartment (increases the pH value) and this reduction of acidity brings about a further coagulation and precipitation of colloidal impurities.

It has been customary to bring about a reduction in the acidity of glucose (dextrose) solutions of one kind or another by the use of neutralizing agents for the purpose of precipitating impurities. But as alkalies react with dextrose, there is a limit to the extent to which they may be used. It is not possible to bring a dextrose solution to anything like the neutral point by the use of alkalies. According to the present method the reduction in acidity, and consequently the purification of the solution, may be carried much further without detriment to the dextrose in the solution.

The fresh dextrose solution flows in constantly, according to the preferred operation of the process, while the treated solution with its impurities in a flocculated and insoluble condition is displaced constantly through the pipe 21, by which pipe the liquid is conducted to any suitable form of filtering apparatus (not shown) consisting either of mechanical filters or bone char filters, or both. The solution thus purified may be crystallized for a yield of high purity dextrose in crystalline form, or may be cast in molds or on the casting floor for block sugar, or it may be reconverted in order to increase its purity (dextrose content) and then crystallized, or with or without further conversion, the solution may be used as syrup.

The acidified water from compartment 11 of the electrolytic cell which may contain some dextrose, can be used for acidifying starch for later conversion.

We claim:

Method of purifying a starch converted dextrose solution which consists in introducing the solution into and withdrawing it from the cathode side of an electrolytic cell having a permeable barrier between its electrodes and introducing water into and withdrawing it from the cell on the other side of the barrier and filtering the dextrose solution withdrawn from the cathode side to remove coagulated and precipitated impurities.

CHARLES EBERT.
WILLIAM B. NEWKIRK.
MEYER MOSKOWITZ.